US005617052A

United States Patent [19]

Kimura

[11] Patent Number: 5,617,052

[45] Date of Patent: Apr. 1, 1997

[54] TRANSCONDUCTANCE-VARIABLE ANALOG MULTIPLIER USING TRIPLE-TAIL CELLS

[75] Inventor: Katsuji Kimura, Tokyo, Japan

[73] Assignee: NEC Corporation, Tokyo, Japan

[21] Appl. No.: 629,132

[22] Filed: Apr. 8, 1996

[30] Foreign Application Priority Data

May 16, 1995 [JP] Japan .................................... 7-141284

[51] Int. Cl.$^6$ .................................................... G06F 7/44

[52] U.S. Cl. ............................................ 327/356; 327/357

[58] Field of Search .................................... 327/355–361, 327/350, 351, 352, 560–563

[56] References Cited

U.S. PATENT DOCUMENTS

| | | | |
|---|---|---|---|
| 5,414,383 | 5/1995 | Cusdin et al. | 327/357 |
| 5,438,296 | 8/1995 | Kimura | 327/356 |
| 5,506,538 | 4/1996 | Liu | 327/361 |
| 5,521,542 | 5/1996 | Kimura | 327/351 |
| 5,523,717 | 6/1996 | Kimura | 327/357 |
| 5,552,734 | 9/1996 | Kimura | 327/356 |
| 5,557,228 | 9/1996 | Liu | 327/357 |

OTHER PUBLICATIONS

K. Kimura, "A Unified Analysis of Four–Quadrant Analog Multipliers Consisting of Emitter and Source–. . . Operable on Low Supply Voltage", *IEICE Trans. Electron.*, vol. E76–C, No. 5, May 1993, pp. 714–737.

K. Kimura, "Circuit Design Techniques for Very Low–Voltage Analog . . . Blocks Using Triple–Tail Cells", *IEEE Trans. on Cir. and Systems –I: Fund. Theory and App.*, vol. 42, No. 11, Nov. 1995, pp. 873–885.

*Primary Examiner*—Toan Tran

*Attorney, Agent, or Firm*—Sughrue, Mion, Zinn, Macpeak & Seas

[57] ABSTRACT

An analog multiplier realizing drastically enlarged input voltage ranges with good linearity, low-voltage operation, and transconductance characteristics adjustment. This multiplier contains a first squarer applied differentially with first and second input signals in opposite phases, and a second squarer applied differentially with said first and second input signals in the same phase. Each of squarers is realized by a bipolar or MOS triple-tail cell including first, second and third transistors whose emitter or sources are coupled together and driven by a single tail current. Bases or gates of the first and second transistors form input ends of the squarer. Collectors or drains of the first and second transistors are coupled together to form one of output ends of the squarer. A collector or drain of the third transistor form the other thereof. A base or gate of the third transistor forms an input end to be applied with a bias signal. The transconductance varies dependent upon the applied bias voltage.

5 Claims, 12 Drawing Sheets

TRANSCONDUCTANCE-VARIABLE ANALOG MULTIPLIER USING TRIPLE-TAIL CELLS

BACKGROUND OF THE INVENTION

1. Field of the Invention

The present invention relates to an analog multiplier for multiplying two analog signals and more particularly, to a four-quadrant analog multiplier formed on a semiconductor integrated circuit device, which is capable of low-voltage operation at a voltage as low as IV, wide input voltage range, and variable transconductance characteristics.

2. Description of the Prior Art

A conventional four-quadrant analog multiplier of this type is disclosed in detail in IEICE Transactions on Electronics, Vol. E76-C, No. 5, pp. 714–737 May 1993, which was developed by the inventor, K. Kimura. This conventional multiplier has a basic configuration as shown in FIG. 1.

In FIG. 1, input ends of a first squarer 1 are applied differentially with first and second input signal voltages $V_x$ and $V_y$ to be multiplied in opposite phases. In other words, the input ends of the first squarer 1 are applied with a voltage $(V_x-V_y)$.

Similarly, input ends of a second squarer 2 are applied differentially with the first and second input signal voltages $V_x$ and $V_y$ in the same phase. In other words, the input ends of the second squarer 2 is applied with a voltage $(V_x+V_y)$.

Output ends of the first squarer 1 are connected to output ends of the second squarer 2 in opposite phase. In other words, the output ends of the first and second squarers 1 and 2 are connected so that output currents $I_1^+$ and $I_1^-$ of the first squarer 1 and output currents $I_2^+$ and $I_2^-$ of the second squarer 2 are subtracted from each other, respectively.

Output currents $I_M^+$ and $I_M^-$ of the multiplier are defined as $(I_1^+-I_1^-)$ and $(I_2^+-I_2^-)$, respectively.

The multiplication result of the first and second input signal voltages $V_x$ and $V_y$ is derived from a differential output current $\Delta I$ of the multiplier, which is defined as $\Delta I=I_M^+-I_M^-$.

With the conventional analog multiplier of FIG. 1, the linear behavior is typically defined by the following algebraic equation (1) as $$\Delta I=\kappa(V_x+V_y)^2-\kappa(V_x-V_y)^2=4\kappa V_xV_y \quad (1)$$

where $\kappa$ is a transconductance constant.

It is seen from the equation (1) that the linear function is defined by the difference between the square of $(V_x+V_y)$ and the square of $(V_x-V_y)$.

The technique utilizing the equation (1) is well known as the "quarter-square technique", in which various multiplier made of two MOSFETs have been studied based on the fact that the MOSFET has the square-law characteristic.

An analog multiplier constitutes a functional circuit block essential for analog signal applications. Recently, semiconductor integrated circuits have been made finer and finer and as a result, their supply voltages have been decreasing from 5 V to 3.3 or 3 V or less. Under such a circumstance, low-voltage circuits that can operate at a low voltage such as 3 V or less has been required to be developed. In the case, the multiplier needs to have linear input voltage ranges as wide as possible.

Also, the Complementary Metal-Oxide-Semiconductor (CMOS) technology has become recognized to be the optimum process technology for Large Scale Integration (LSI), so that analog multipliers that can be realized on the LSI using the CMOS technology have been required.

The above conventional analog multiplier is not capable of low-voltage operation at a voltage less than 3 V because of its circuit configuration.

Also, the above conventional analog multiplier is capable of low-voltage operation if it is composed of MOS field-effect transistors (MOSFETs). However, it is preferred that the input voltage ranges with good linearity are as wide as possible.

Further, the transconductance characteristics cannot be adjusted in the above conventional analog multiplier.

SUMMARY OF THE INVENTION

Accordingly, an object of the present invention is to provide an analog multiplier that enables to have drastically enlarged input voltage ranges with good linearity.

Another object of the present invention is to provide an analog multiplier capable of low-voltage operation at a voltage as low as approximately 1 V.

Still another object of the present invention is to provide an analog multiplier that enables to adjust the transconductance characteristics.

The above objects together with others not specifically mentioned will become clear to those skilled in the art from the following description.

An analog multiplier according to the present invention has (a) a first squarer applied differentially with first and second input signals to be multiplied in opposite phases, and (b) a second squarer applied differentially with said first and second input signals in the same phase. The first and second squarers contain first and second triple-tail cells, respectively.

The first triple-tail cell includes first, second and third transistors whose emitter or sources are coupled together and driven by a single tail current. The first and second transistors form a differential transistor pair. Bases or gates of the first and second transistors form input ends of the first squarer to be applied with the first and second input signals.

Collectors or drains of said first and second transistors are coupled together to form one of output ends of the first squarer. A collector or drain of the third transistor form the other of the output ends of the first squarer. A base or gate of the third transistor forms an input end to be applied with a bias signal.

The second triple-tail cell includes fourth, fifth and sixth transistors whose emitter or sources are coupled together and driven by a single tail current. The fourth and fifth transistors form a differential transistor pair. Bases or gates of the fourth and fifth transistors form input ends of the second squarer to be applied with the first and second input signals.

Collectors or drains of said fourth and fifth transistors are coupled together to form one of output ends of the second squarer. A collector or drain of the sixth transistor form the other of the output ends of the second squarer. A base or gate of the sixth transistor forms an input end to be applied with the bias signal.

The coupled collectors or drains of the first and second transistors forming one of the output ends of the first squarer are connected to the collector or drain of the sixth transistor forming the other of the output ends of the second squarer, thereby forming one of output ends of the multiplier.

The collector or drain of the third transistor forming the other of the output ends of the first squarer is connected to the coupled collectors or drains of the fourth and fifth transistors forming one of the output ends of the second squarer, thereby forming the other of the output ends of the multiplier.

The multiplication result of the first and second input signals is taken out from the output ends of the multiplier.

with the analog multiplier according to the present invention, since the first and second triple-tail cells are used as the first and second squarers, respectively, the input voltage ranges with good linearity can be drastically enlarged.

Also, no stacked transistors are used in the multiplier and only three emitter- or source-coupled transistors are necessary. As a result, this multiplier is capable of low-voltage operation at a voltage as low as approximately 1 V.

Further, because the bias voltage is applied to the third and sixth transistors, respectively, the transconductance characteristics can be adjusted by changing the value of the bias voltage.

In a preferred embodiment of the invention, the first and second transistors of the first triple-tail cell have the same driving capability, and the third transistor thereof has a driving capability k times as large as that of the first and second transistors, where k is equal to or greater than unity.

Similarly, the fourth and fifth transistors of the second triple-tail cell have the same driving capability, and the sixth transistor thereof has a driving capability κ times as large as that of the fourth and fifth transistors.

When the first, second, third, fourth, fifth and sixth transistors are MOSFETs, the first and second MOSFETs have the same gate-width (W) to gate-length (L) ratio (W/L), and the third MOSFET has a gate-width (W) to gate-length (L) ratio (W/L) κ times as large as that of the first and second MOSFETs.

Similarly, the fourth and fifth MOSFETs have the same gate-width (W) to gate-length (L) ratio (W/L), and the sixth MOSFET has a gate-width (W) to gate-length (L) ratio (W/L) κ times as large as that of the fourth and fifth MOSFETs.

When the first, second, third, fourth, fifth and sixth transistors are bipolar transistors, the first and second bipolar transistors have the same emitter area, and the third bipolar transistor has an emitter area κ times as large as that of the first and second bipolar transistors.

The fourth and fifth bipolar transistors have the same emitter area, and the sixth bipolar transistor has an emitter area κ times as large as that of the fourth and fifth bipolar transistors.

In another preferred embodiment of the invention, the bias signal is variable. In this case, an advantage that the transconductance characteristics of the multiplier can be adjusted occurs.

DETAILED DESCRIPTION OF THE PREFERRED EMBODIMENTS

Preferred embodiments of the present invention will be described below referring to FIGS. 2 to 14.

FIRST EMBODIMENT

Figure 1:
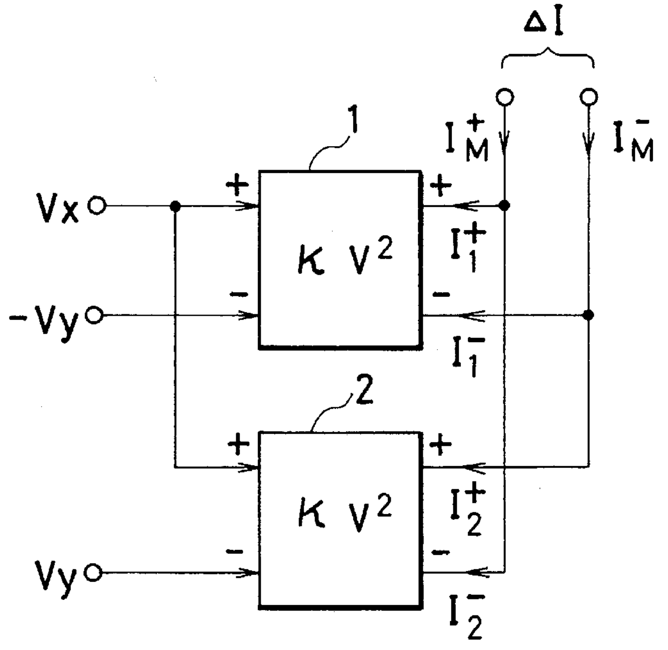
FIG. 1 PRIOR ART
FIG. 1 is a circuit block diagram showing a basic configuration of a conventional four-quadrant analog multiplier.
Figure 2:
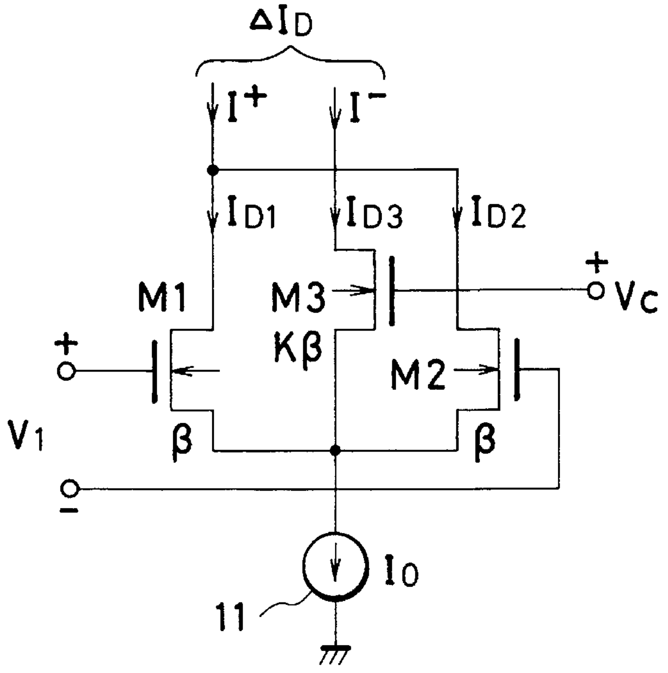
FIG. 2 is a circuit diagram showing an MOS squarer used for an analog multiplier according to a first embodiment of the present invention, which contains a triple-tail cell.

A four-quadrant analog multiplier according to a first embodiment has the same basic configuration as shown in FIG. 1, and a MOS squarer shown in FIG. 2 is used as each squarer in FIG. 1.

Specifically, this analog multiplier according to the first embodiment has a first squarer applied differentially with first and second input voltages $V_x$ and $V_y$ to be multiplied in opposite phases, and a second squarer applied differentially with said first and second input voltages $V_x$ and $V_y$ in the same phase. The first and second squarers contain first and second triple-tail cells as shown in FIG. 2, respectively.

In FIG. 2, this squarer or triple-tail cell has three MOSFETs M1, M2 and M3 whose sources are coupled together to be connected to one end of a constant current source 11 supplying a constant current $I_0$. The other end of the source 11 is grounded. The three MOSFETs M1, M2 and M3 are driven by the single tail current $I_0$.

The MOSFETs M1 and M2 form a differential transistor pair. Gates of the MOSFETs M1 and M2 form input ends of the pair or squarer to be applied with an input voltage $V_1$, which is equal to $(V_x+V_y)$ or $(V_x-V_y)$.

Drains of the MOSFETs M1 and M2 are coupled together to form one of output ends of the squarer, from which an output current $I^+$ is derived. A drain of the MOSFET M3 forms the other of output ends thereof, from which an output current $I^-$ is derived.

A gate of the MOSFET M3 forms an input end to be applied with a bias voltage $V_c$.

The MOSFETs M1 and M2 have the same ratio (W/L) of a gate-width (W) to a gate-length (L). The MOSFET M3 has a ratio (W/L) of κ times as large as those of the MOSFETs M1 and M2, where κ is equal to or greater than unity (i.e., $K \geqq 1$).

Assuming that the MOSFETs M1, M2 and M3 are matched in characteristic and are operating in the saturation region, and that they have the square-law characteristics, respectively, and ignoring the body-effect, drain currents $I_{D1}$, $I_{D2}$ and $I_{D3}$ of the respective MOSFETs M1, M2 and M3 can be expressed as the following equations (2) to (7), respectively.

$$\Delta I_{D1} = \beta\left(V_R - V_S + \frac{1}{2}V_1 - V_{TH}\right)^2 \left(V_R - V_S - \frac{1}{2}V_1 \geqq V_{TH}\right) \tag{2}$$

$$\Delta I_{D1} = 0\left(V_R - V_S - \frac{1}{2}V_1 \leqq V_{TH}\right) \tag{3}$$

$$\Delta I_{D2} = \beta\left(V_R - V_S - \frac{1}{2}V_1 - V_{TH}\right)^2 \left(V_R - V_S + \frac{1}{2}V_1 \geqq V_{TH}\right) \tag{4}$$

$$\Delta I_{D2} = 0\left(V_R - V_S + \frac{1}{2}V_1 \leqq V_{TH}\right) \tag{5}$$

$$\Delta I_{D3} = K\beta(V_R - V_S + V_C - V_{TH})^2 \left(V_R - V_S - \frac{1}{2}V_2 \geqq V_{TH}\right) \tag{6}$$

$$\Delta I_{D3} = 0\left(V_R - V_S - \frac{1}{2}V_2 \leqq V_{TH}\right) \tag{7}$$

In the above equations (2) to (7), β is the transconductance parameter of these MOSFETs. β is expressed as μ (Cox/2) (W/L) where is the effective carrier mobility, $C_{ox}$ is the gate oxide capacitance per unit area, and W and L are a gate-width and a gate-length of these MOSFETs, respectively. Also, $V_{TH}$ is the threshold voltage of the MOSFETs M1, M2 and M3. $V_R$ is the dc component of the input voltage $V_1$. $V_s$ is the common source voltage of the MOSFETs M1, M2 and M3.

The (+)-side input end, i.e., the gate of the MOSFET M1, is applied with a voltage of $(½)(V_1+V_R)$. The (−)-side input end, i.e., the gate of the MOSFET M2, is applied with a voltage of $(-½)(V_1+V_R)$.

A tail current of the cell is expressed as the following equation (8).

$$I_{D1}+I_{D2}+I_{D3}=I_o \tag{8}$$

Solving the equation (8) by using the equations (2), (4) and (6), the output currents $I^+$ and $I^-$ of the squarer or triple-tail cell are expressed as the following equations (10) and (11), respectively. The following expression (9) shows the range input voltage $V_1$ where all the MOSFETs M1, M2 and M3 do not cut off.

$$|V_1| \leqq \text{Min}\left\{\sqrt{\frac{2I_0}{\beta} - V_1^2}\ ,\ \frac{1}{K+4}\left(-2KV_C + \sqrt{\frac{(K+4)I_0}{\beta} - 4KV_C^2}\right)\right\} \tag{9}$$

$$I^+ = I_{D1} + I_{D2} = \frac{2K-2}{K+2}I_0 + \frac{K\beta}{2(K+2)}V_1^2 + \frac{2K(K-2)}{(K+2)^2}V_C^2 + \frac{4KV_C}{(K+1)^2}\sqrt{\frac{(K+2)I_0}{\beta} - \frac{K+2}{2}V_1^2 - 2KV_C^2} \tag{10}$$

$$I^- = I_{D3} = \frac{K-2}{K+2}I_0 - \frac{K\beta}{2(K+2)}V_1^2 - \frac{2K(K-2)}{(K+2)^2}V_C^2 - \frac{4KV_C}{(K+1)^2}\sqrt{\frac{(K+2)I_0}{\beta} - \frac{K+2}{2}V_1^2 - 2KV_C^2} \tag{11}$$

Figure 3:
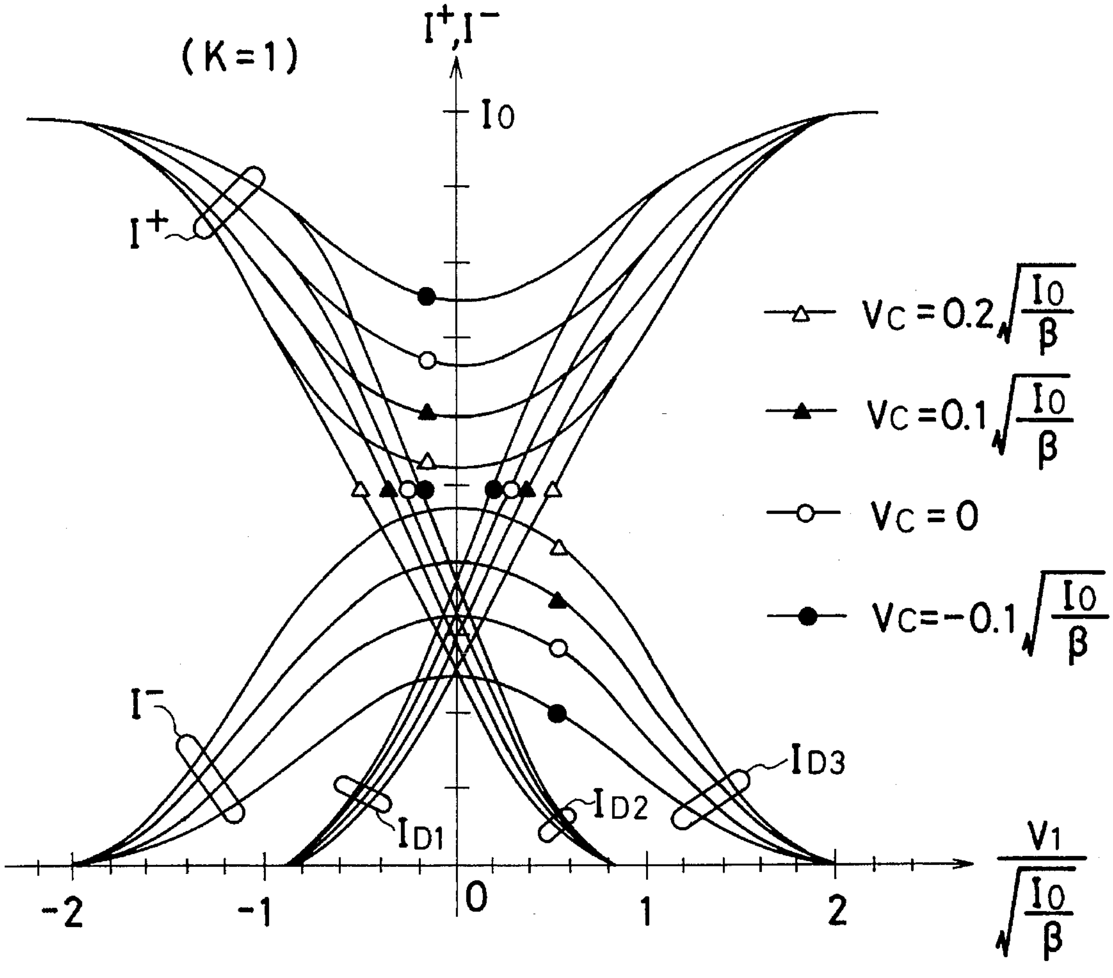
FIG. 3 shows the transfer characteristic of the MOS squarer of FIG. 2 with respect to the input voltage $V_1$.

FIG. 3 shows the transfer characteristic of the MOS squarer of FIG. 2 with respect to the input voltage $V_1$. In FIG. 3, $V_1$ is normalized by $(I_0/\beta)^{1/2}$.

In FIG. 3, the parameter κ is set as unity (i.e., K =1) and therefore, all of the MOSFETs M1, M2 and M3 are minimum-sized unit transistors.

Using the equations (10) and (11), the differential output current ΔI of the triple-tail cell of FIG. 2 is expressed as the following equation (12):

$$\Delta I_D = (I_{D1} + I_{D2}) - I_{D3} = \frac{K-2}{K+2}I_0 + \frac{K\beta}{K+2}V_1^2 + \frac{4K(K-2)}{(K+1)^2}V_C^2 + \frac{\beta KV_C}{(K+1)^2}\sqrt{\frac{(K+2)I_0}{\beta} - \frac{K+2}{2}V_1^2 - 2KV_C^2} \tag{12}$$

Figure 12:
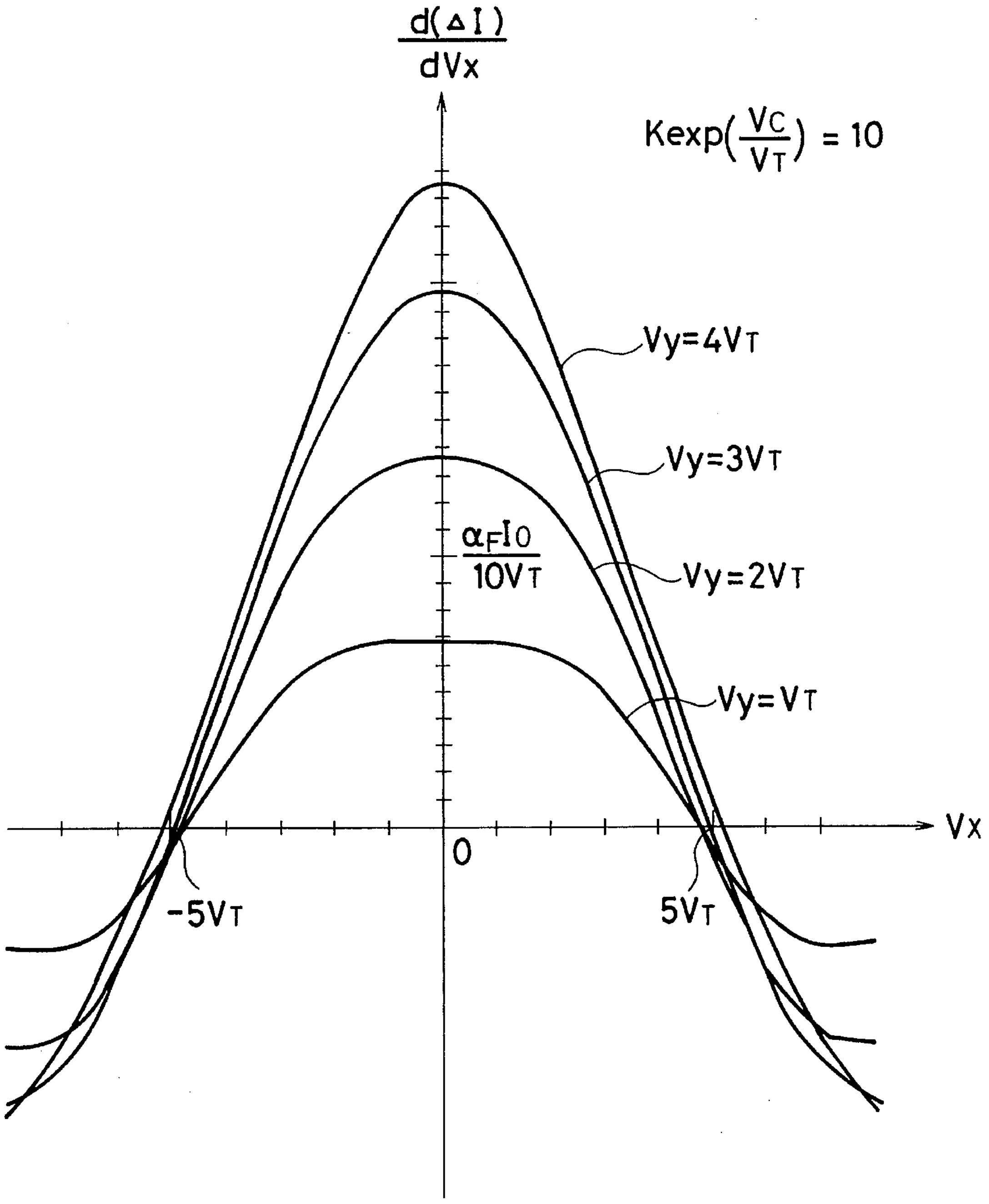
FIG. 12 shows the transconductance characteristics of the bipolar analog multiplier according to the second embodiment with respect to the input voltage $V_x$, in which the bipolar square of FIG. 7 is used and the input voltage $V_y$ is used as a parameter.

It is seen from FIG. 12 that the square-law characteristic varies dependent upon the dc bias voltage $V_c$. When $V_c0$, an ideal square-law characteristic can be obtained within the input voltage range as shown in the expression (9), as shown in the following equations (13), (14) and (15).

$$I^+|_{V_C=0} = \frac{2(2K-2)}{K+2}I_0 + \frac{K\beta}{2(K+2)}V_1^2 \tag{13}$$

$$I^-|_{V_C=0} = \frac{K-2}{K+2}I_0 - \frac{K\beta}{2(K+2)}V_1^2 \tag{14}$$

$$\Delta I_D|_{V_C=0} = \frac{K-2}{K+2}I_0 + \frac{K\beta}{K+2}V_1^2 \tag{15}$$

Figure 4:
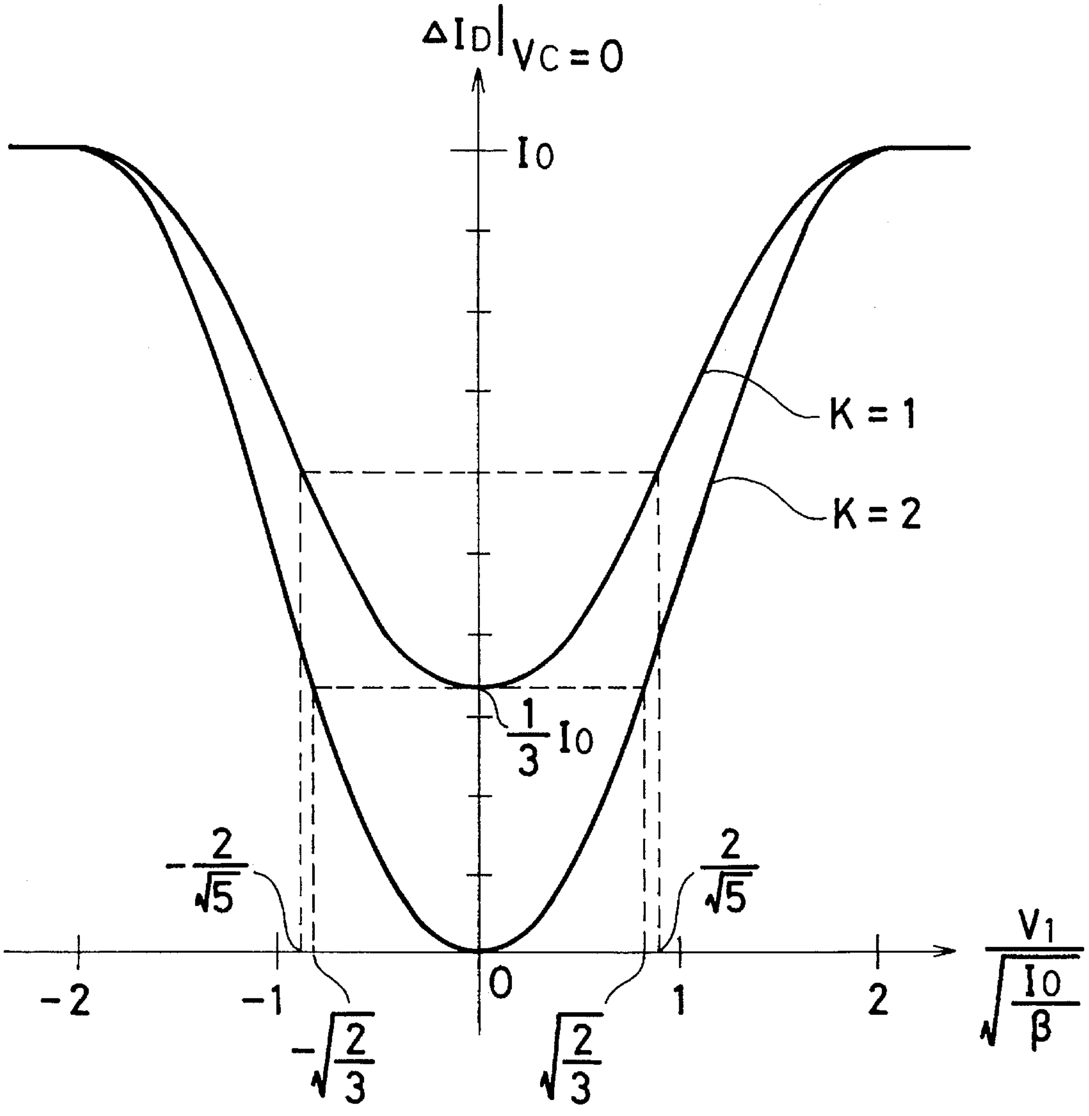
FIG. 4 shows the transconductance characteristics of the MOS squarer of FIG. 2 with respect to the input voltage $V_1$, where $V_c=0$.

FIG. 4 shows the transconductance characteristics of the MOS squarer of FIG. 2 with respect to the input voltage $V_1$, where $V_c=0$ and K=1 and 2.

When the input voltages to the first and second squarers 1 and 2 are $V_1$ and $V_2$, respectively, the following equations (16) and (17) are established.

$$V_1=V_x+V_y \tag{16}$$

$$V_2=V_x-V_y \tag{17}$$

Therefore, the differential output current ΔI of the multiplier is given by the following equation (18) independent of the bias voltage $V_c$, where K=1.

$$\Delta I = \left\{ \frac{1}{3} I_0 + \frac{1}{3} \beta (V_x + V_y)^2 \right\} - \left\{ \frac{1}{3} I_0 + \frac{1}{3} \beta (V_x - V_y)^2 \right\} = \frac{4}{3} \beta V_x V_y \qquad (18)$$

If either of the output currents $I^+$ and $I^-$ of the squarer is used, the output current ΔI of the multiplier is equal to half of the equation (18). By using the square-law characteristic of the MOSFET is used, deal multiplication characteristics can be obtained.

As stated above, the transfer if input/output characteristics of the multiplier varies dependent upon the dc bias voltage $V_c$. In other words, the characteristic curves tend to shift from the ideal square-law characteristic. However, the input voltages $V_1$ and $V_2$ of the squarers are expressed as in the equations (16) and (17), and the square-root terms in the equations (10), (11) and (12) are subtracted from each other. As a result, the square-law characteristic can be approximately kept for the small values of the voltages $V_1$ and $V_2$.

Thus, the transconductance characteristics of the multiplier can be changed by adjusting the dc bias voltage $V_c$.

Figure 5:
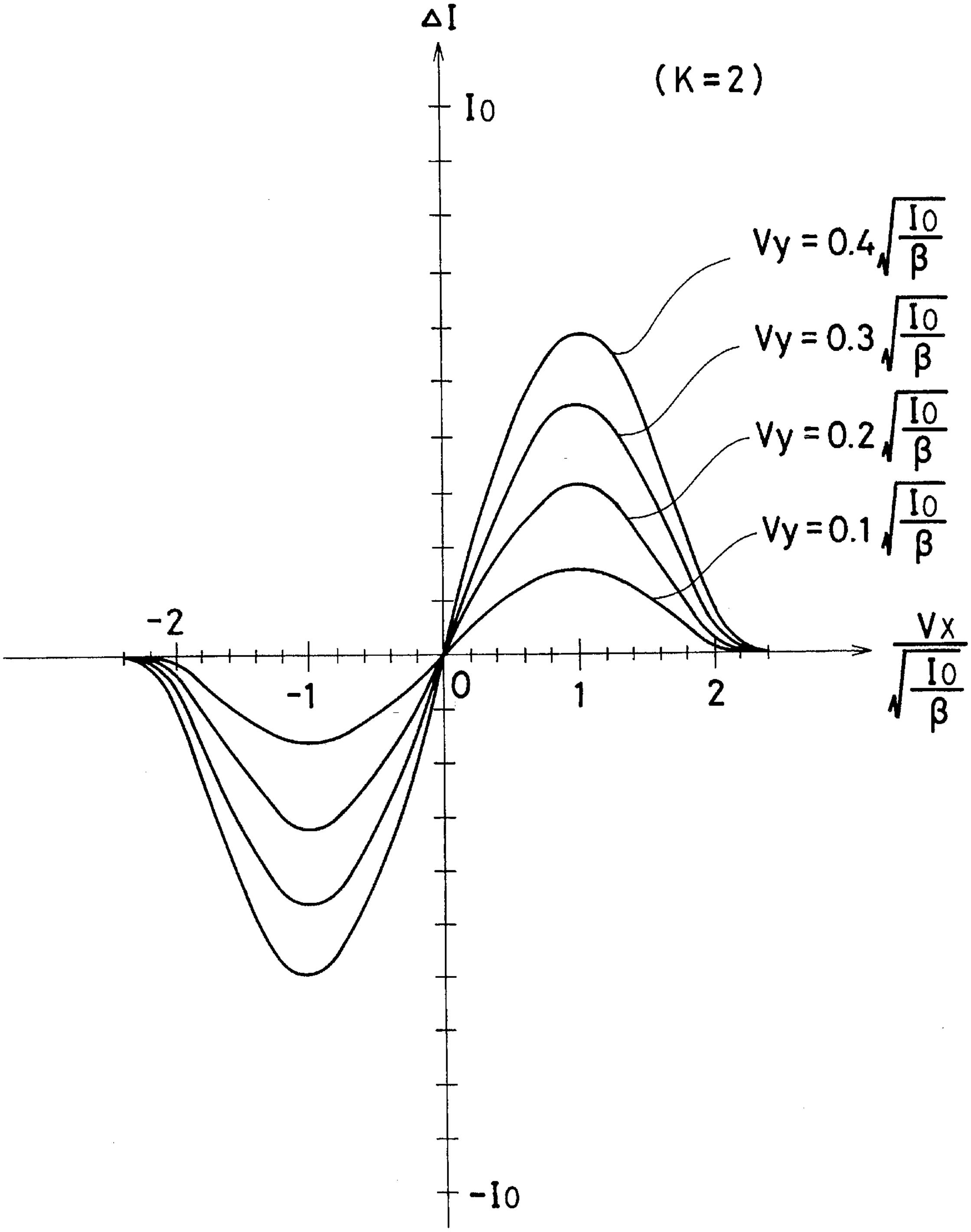
FIG. 5 shows the transfer characteristic of the MOS analog multiplier according to the first embodiment with respect to the input voltage $V_x$, in which the MOS squarer of FIG. 2 is used and the input voltage $V_y$ is used as a parameter.

FIG. 5 shows the transfer characteristic of the analog multiplier according to the first embodiment, where K=2.

The transconductance of the multiplier is given by differentiating ΔI in the equation (18) by $V_x$, as shown in the following equation (19).

$$\frac{d(\Delta I)}{dV_x} = \frac{2}{3} V_y \qquad (19)$$

Figure 6:
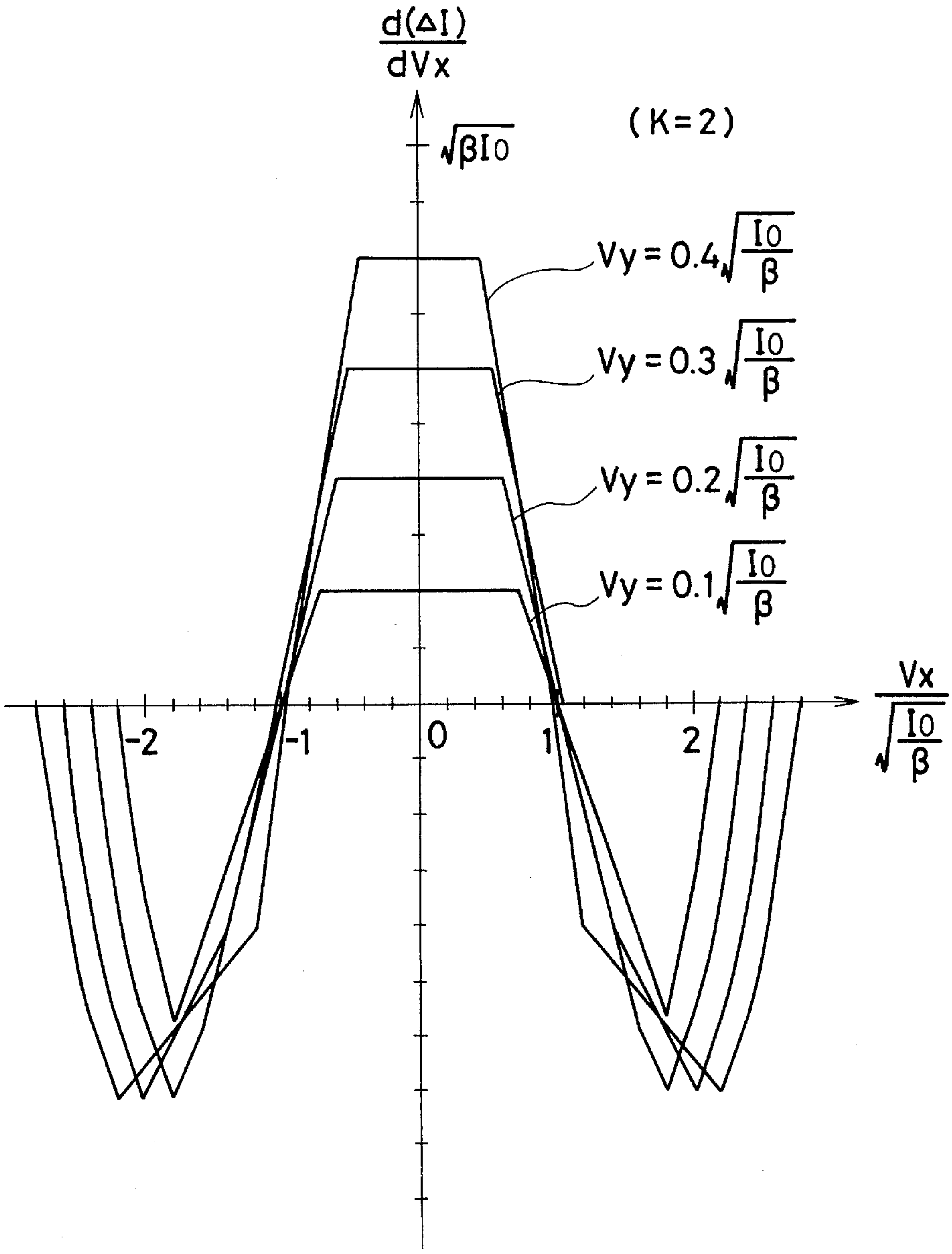
FIG. 6 shows the transconductance characteristics of the MOS analog multiplier according to the first embodiment with respect to the input voltage $V_x$, in which the MOS squarer of FIG. 2 is used and the input voltage $V_y$ is used as a parameter.

FIG. 6 shows the transconductance characteristics of the MOS analog multiplier according to the first embodiment, where K=2.

As described above, With the analog multiplier according to the first embodiment, since two triple-tail cells are used as two squarers, respectively, the input voltage ranges with good linearity can be drastically enlarged.

Also, no stacked transistors are used in the multiplier and only three source-coupled MOSFETs are necessary. As a result, this multiplier is capable of low-voltage operation at a voltage as low as approximately 1 V.

Further, because the dc bias voltage $V_c$ is applied to the MOSFET M3, the transconductance characteristics can be adjusted by changing the value of the bias voltage $V_c$.

SECOND EMBODIMENT

Figure 7:
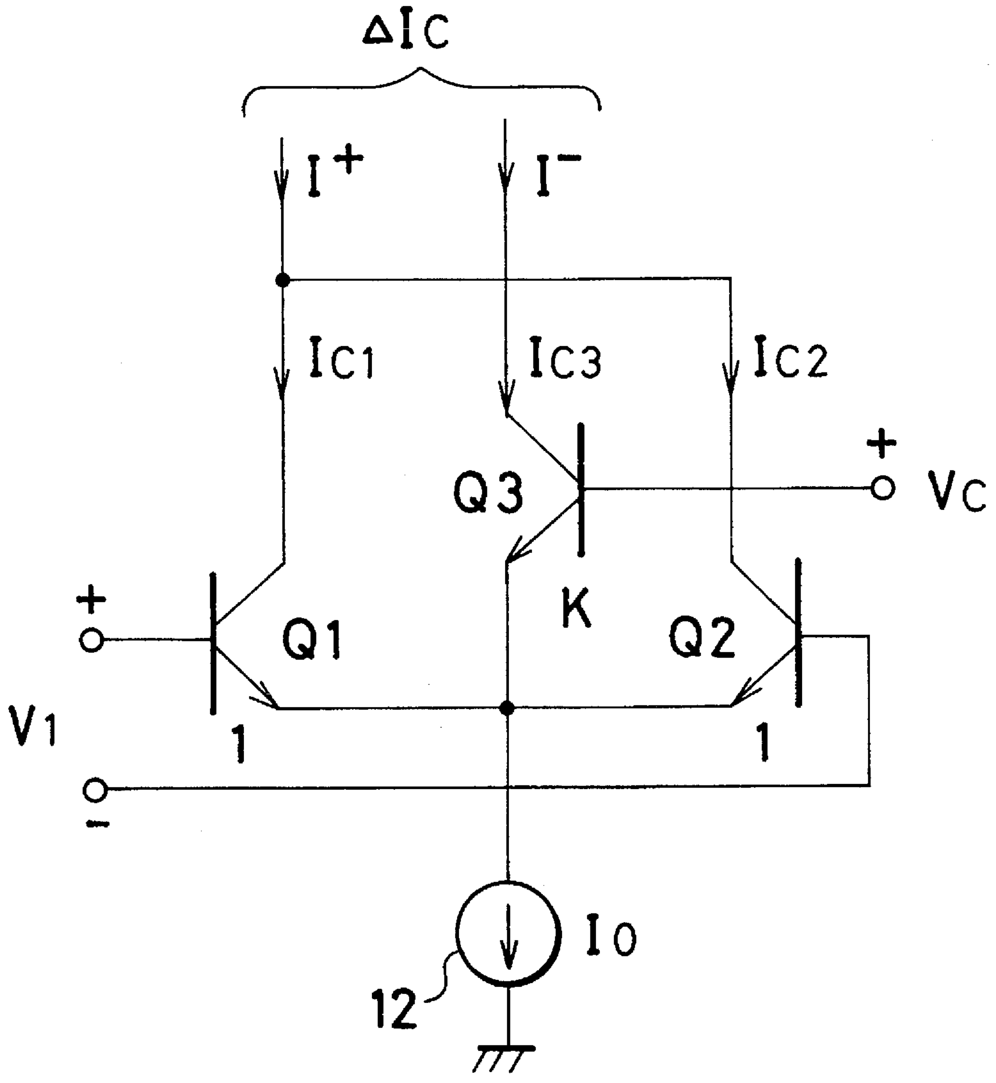
FIG. 7 is a circuit diagram showing a bipolar squarer used for an analog multiplier according to a second embodiment of the present invention, which contains a triple-tail cell.
Figure 8:
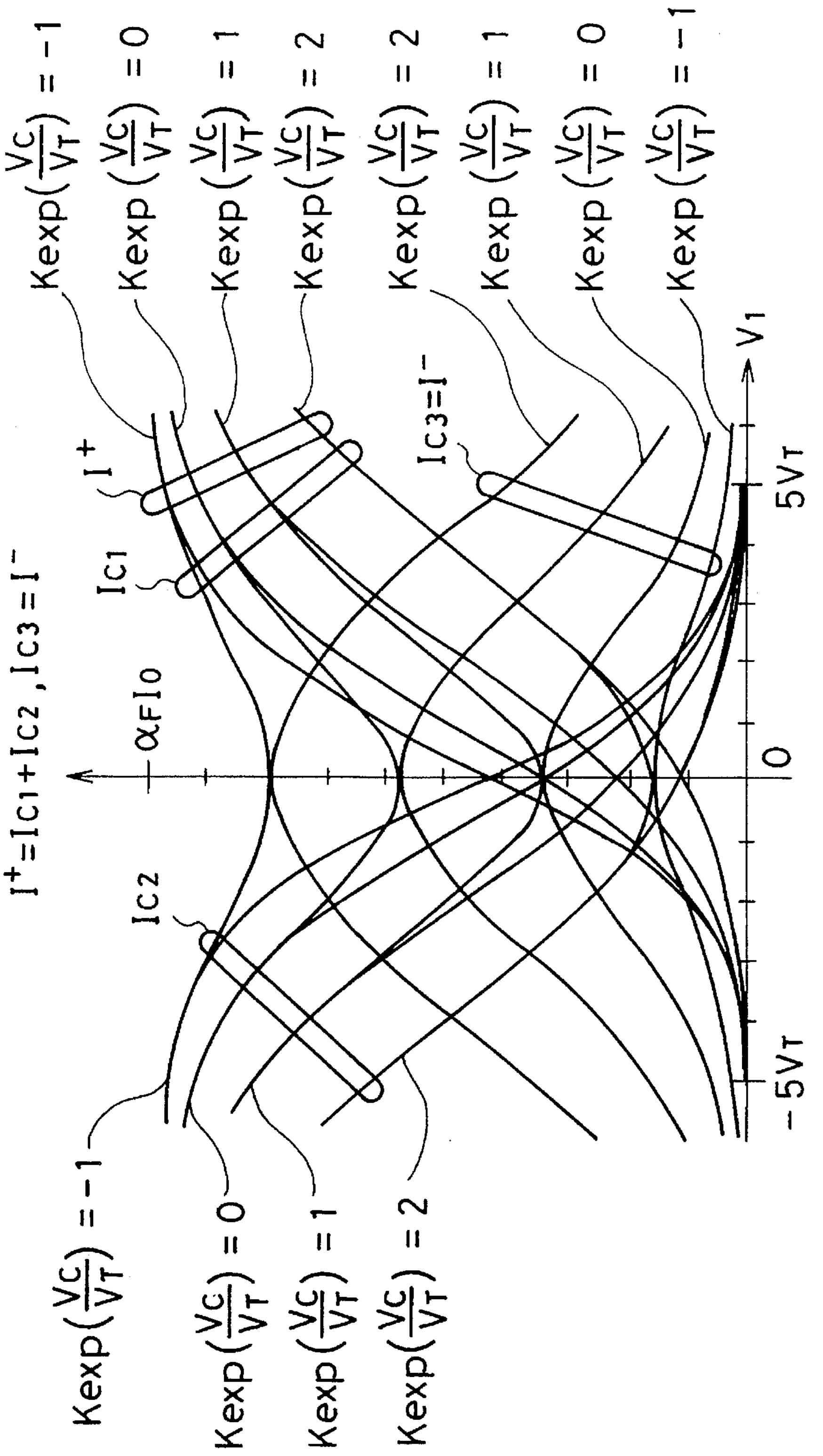
FIG. 8 shows the transfer characteristic of the bipolar squarer of FIG. 7 with respect to the input voltage $V_1$.

A bipolar squarer used for a four-quadrant analog multiplier according to a second embodiment is shown in FIG. 7. This bipolar squarer has the same configuration as that of the MOS squarer shown in FIG.2 except that npn-type bipolar transistors Q1, Q2 and Q3 are added in place of the MOSFETs M1, M2 and M3, respectively.

Therefore, the description relating to the same configuration is omitted here for the sake of simplicity.

The transistors Q1 and Q2 has the same emitter area, and the transistors Q3 has an emitter area κ times as large as that of the transistors Q1 and Q2.

The operation of the bipolar squarer or triple-tail cell is explained below.

Assuming that the relationship between the collector current and the base-emitter voltage varies dependent on the exponent-law characteristic, the collector current $I_{ci}$ of the i–th (i=1, 2 and 3) transistor is expressed as the following equation (20).

$$I_{C1} = I_S \left\{ \exp\left( \frac{V_{BE1}}{V_T} \right) - 1 \right\} \qquad (20)$$

In the equation (20), $I_s$ is the saturation current, $V_{BE}$ is the base-emitter voltage of each transistor, and $V_T$ is the thermal voltage. The thermal voltage $V_T$ is expressed as $V_T$=kT/q where k is Boltzmann's constant, T is absolute temperature in degrees Kelvin and q is the charge of an electron.

In the equation (10), if $V_{BE}$ is about 600 mV, the exponential term "exp ($V_{BE}/V_T$)" has a value in the order of $e^{10}$, and therefore, the term "−1" can be neglected.

Then, assuming that all the transistors Q1, Q2 and Q3 are matched in characteristic, the collector currents of the transistors Q1, Q2 and Q73 driven by the tail current $I_0$ are expressed as the following equations (21), (22) and (23), respectively, where $V_R$ is the dc voltage of the input signals and $V_E$ is the common emitter voltage.

$$I_{C1} = I_S \exp \frac{\left( V_R - V_E + \frac{1}{2} V_1 \right)}{V_T} \qquad (21)$$

$$I_{C2} = I_S \exp \frac{\left( V_R - V_E - \frac{1}{2} V_1 \right)}{V_T} \qquad (22)$$

$$I_{C3} = K I_S \exp \frac{(V_R - V_E + V_C)}{V_T} \qquad (23)$$

Since the triple-tail cell is driven by the common tail current $I_0$, the following equation (24) needs to be satisfied additionally, where αF is the dc common-base current gain factor.

$$I_{C1} + I_{C3} = \alpha_F I_0 \qquad (24)$$

The common term: $I_s$.exp{($V_R$−$V_E$)/$V_T$}can be obtained by using the equations (21), (22), (23) and (24) as in the following equation (25):

$$I_S \exp\left( \frac{V_R - V_E}{V_T} \right) = \frac{\alpha_F I_0}{2\cosh\left( \frac{V_1}{2V_T} \right) + K \exp\left( \frac{V_C}{V_T} \right)} \qquad (25)$$

Then, the output currents $I^+$ and $I^-$ of the bipolar triple-tail cell or squarer is given by the following equations (26) and (27), respectively:

$$I^+ = I_{C1} + I_{C2} = \frac{2\alpha_F I_0 \left\{ \cosh\left( \frac{V_1}{2V_T} \right) + K \exp\left( \frac{V_C}{V_T} \right) \right\}}{2\cosh\left( \frac{V_1}{2V_T} \right) + K \exp\left( \frac{V_C}{V_T} \right)} \qquad (26)$$

$$I^- = I_{C3} = \frac{K \alpha_F I_0 \exp\left( \frac{V_C}{V_T} \right)}{2\cosh\left( \frac{V_1}{2V_T} \right) + K \exp\left( \frac{V_C}{V_T} \right)} \qquad (27)$$

From the equations (26) and (27), the differential output current ΔI of the squarer is given as the following equation (28):

$$\Delta I_C = (I_{C1} + I_{C2}) - I_{C3} = \frac{\alpha_F I_0 \left\{ 2\cosh\left( \frac{V_1}{2V_T} \right) - K \exp\left( \frac{V_C}{V_T} \right) \right\}}{2\cosh\left( \frac{V_1}{2V_T} \right) + K \exp\left( \frac{V_C}{V_T} \right)} \qquad (28)$$

Figure 9:
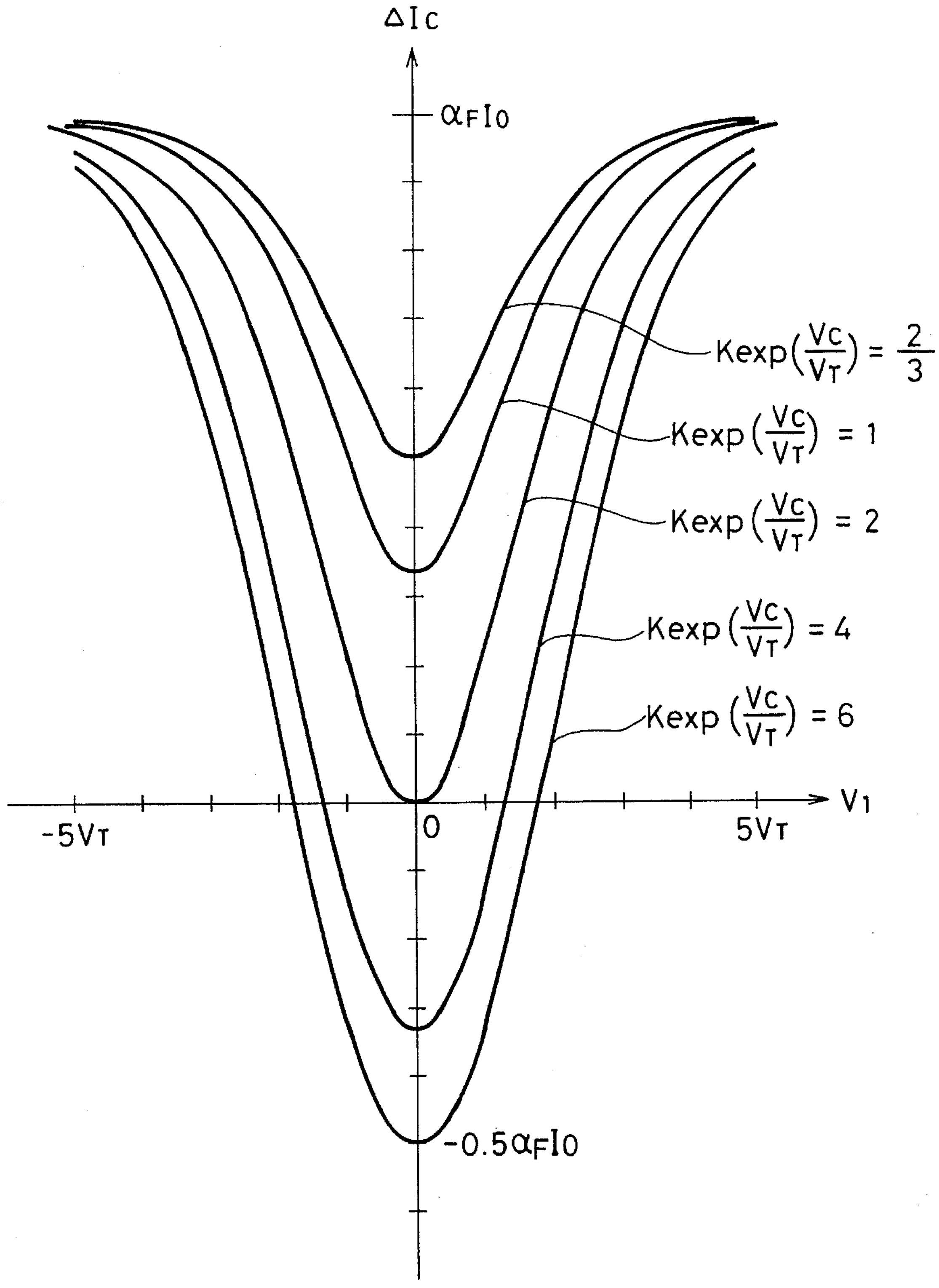
FIG. 9 shows the transfer characteristic of the bipolar squarer of FIG. 7 with respect to the input voltage $V_1$.

FIG. 9 shows the transfer characteristic of the bipolar squarer of FIG. 7 where [K.exp($V_c/V_T$)] is used as a parameter. As seen from FIG. 9, in the bipolar squarer of FIG. 7, the input voltage range where the square-law characteristic is approximately realized can be varied by controlling or adjusting the bias voltage $V_c$. Also, the coefficient of the square term of $V_1$ can be varied.

The transconductance of the bipolar squarer is obtained by differentiating the equations (26), (27) and (28) by $V_1$ as in the following equation (29).

$$\frac{d(I^-)}{dV_1} = -\frac{\alpha_F I_0}{V_T} \frac{\sinh\left(\frac{V_1}{2V_T}\right)\left\{K\exp\left(\frac{V_C}{V_T}\right)\right\}}{\left\{2\cosh\left(\frac{V_1}{2V_T}\right)+K\exp\left(\frac{V_C}{V_T}\right)\right\}^2} \tag{29}$$

Figure 10:
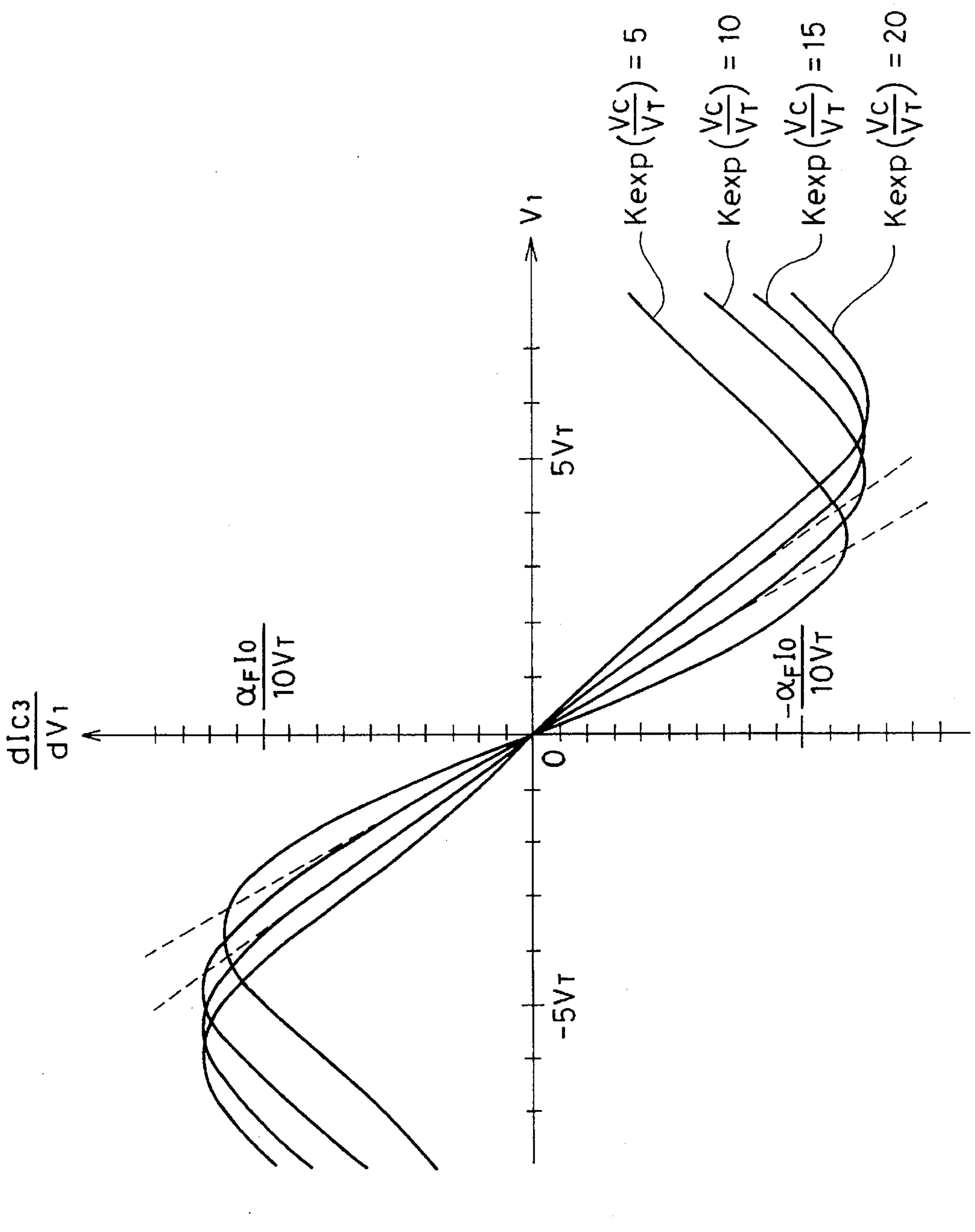
FIG. 10 shows the transfer characteristic of the bipolar squarer of FIG. 7 with respect to the input voltage $V_1$.

FIG. 10 shows the transfer characteristic of the bipolar squarer of FIG. 7 with respect to the input voltage $V_1$, where $[K.\exp(V_C/V_T)]$ is used as a parameter. The maximum flatness of the transconductance curve is given at which the third differential coefficient of the differential output current of the squarer is equal to zero at $V_1=0$. From this, the following equation (30) is obtained:

$$K\exp\left(\frac{V_C}{V_T}\right) = 10 \tag{30}$$

Accordingly, the maximum flatness condition of the transconductance curve for the bipolar squarer at $V_1=0$ is determined at $[K.\exp(V_C/V_T)]=10$ and its neighborhood. In this embodiment, the value of the parameter $[K.\exp(V_C/V_T)]$ is approximately in the range from 5 to 20.

The equation (30) can be approximated as shown in the following expression (31):

$$V_C = V_T\ln\left(\frac{10}{K}\right) \tag{31}$$

Using the condition of the equation (31), the differential output current ΔI of the multiplier can be given by the following equation (32):

$$\Delta I = \alpha_F I_0 \exp\left(\frac{V_C}{V_T}\right)\left[\frac{1}{2\cosh\left(\frac{V_x-V_y}{2V_T}\right)+K\exp\left(\frac{V_C}{V_T}\right)} - \frac{1}{\cosh\left(\frac{V_x+V_y}{2V_T}\right)+\exp\left(\frac{V_C}{V_T}\right)}\right] \tag{32}$$

Figure 11:
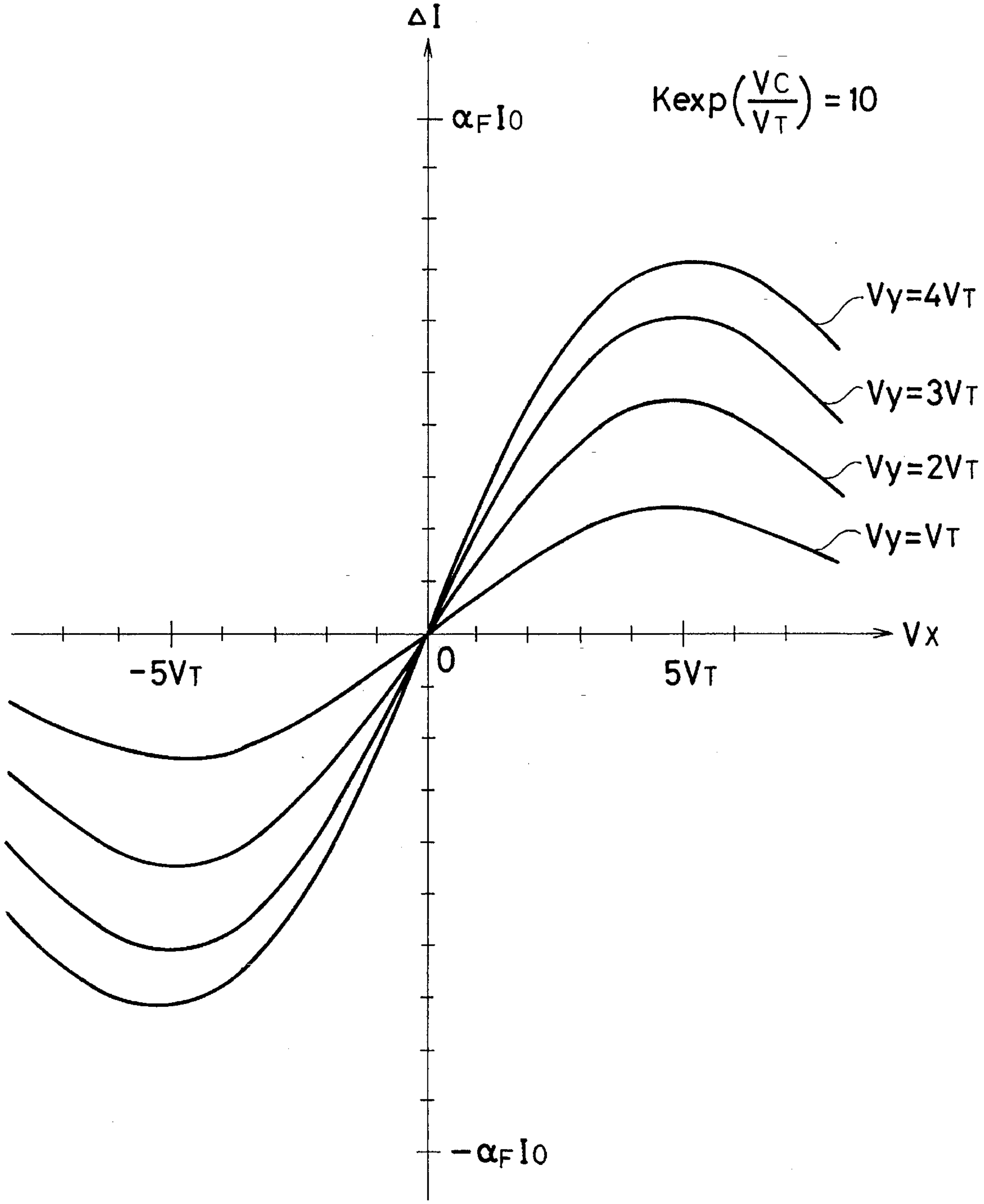
FIG. 11 shows the transfer characteristic of the bipolar analog multiplier according to the second embodiment with respect to the input voltage $V_x$, in which the bipolar squarer of FIG. 7 is used and the input voltage $V_y$ is used as a parameter.

FIG. 11 shows the transfer characteristic of the bipolar analog multiplier according to the second embodiment, in which the input voltage $V_y$ is used as a parameter and $[K.\exp(V_C/V_T)]=10$.

The transconductance of the bipolar analog multiplier is given by differentiating the equation (32) by $V_x$ as in the following equation (33):

$$\frac{d(\Delta I)}{dV_x} = \frac{\alpha_F I_0}{V_T}\exp\left(\frac{V_C}{V_T}\right)\left[\frac{\sinh\left(\frac{V_x+V_y}{2V_T}\right)}{\left\{2\cosh\left(\frac{V_x+V_y}{2V_T}\right)+K\exp\left(\frac{V_C}{V_T}\right)\right\}^2} - \frac{\sinh\frac{(V_x-V_y)}{2V_T}}{\left\{\cosh\left(\frac{V_x-V_y}{2V_T}\right)+\exp\left(\frac{V_C}{V_T}\right)\right\}^2}\right] \tag{33}$$

Figure 13:
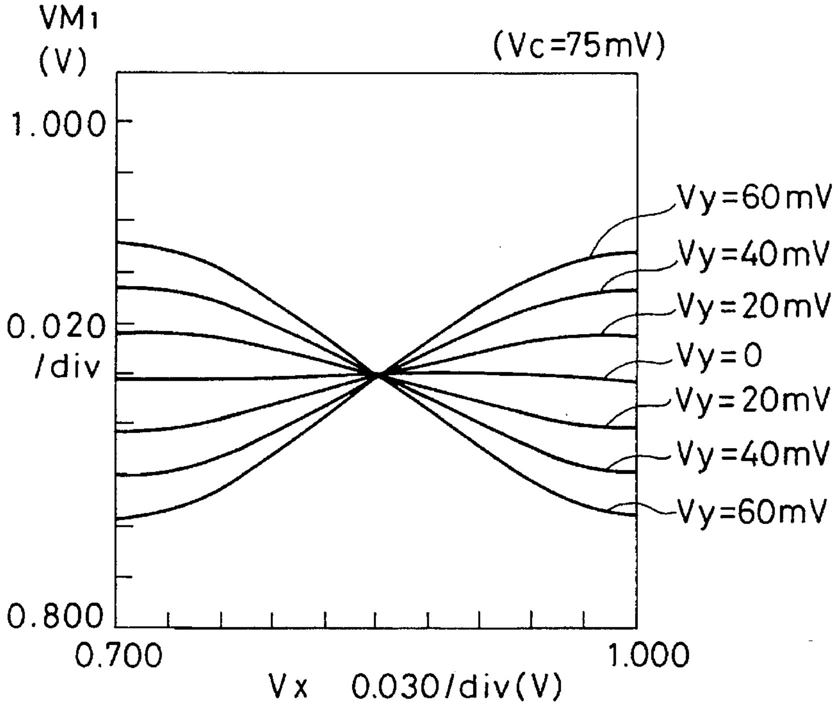
FIG. 13 shows the measured dc transfer characteristics of the bipolar analog multiplier according to the second embodiment with respect to the input voltage $V_x$, in which the bipolar square of FIG. 7 is used and the input voltage $V_y$ is used as a parameter.
Figure 14:
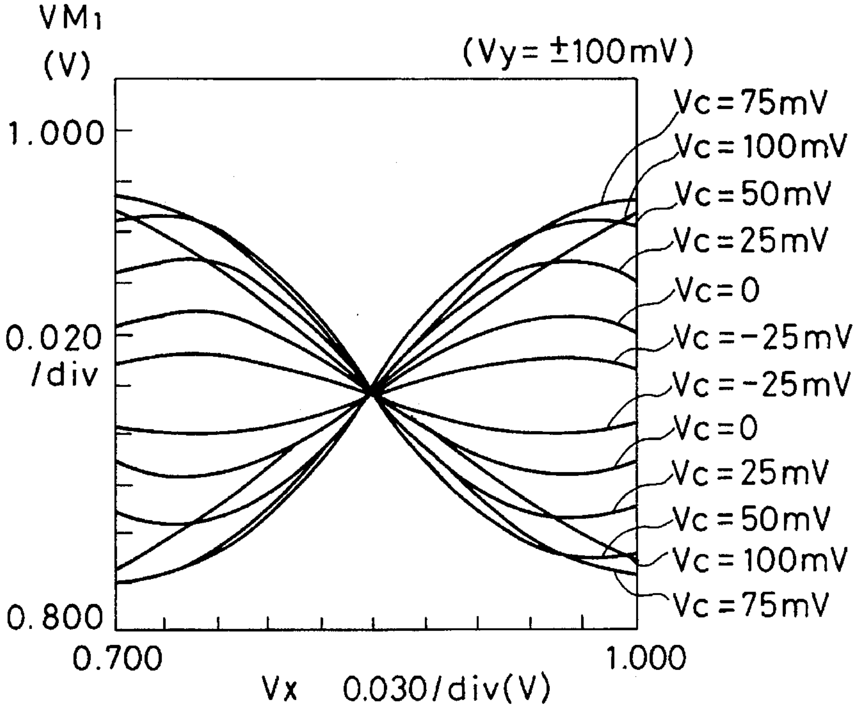
FIG. 14 shows the measured dc transfer characteristics of the bipolar analog multiplier according to the second embodiment with respect to the input voltage $V_x$, in which the bipolar squarer of FIG. 7 is used and the bias voltage $V_c$ is used as a parameter.

FIGS. 13 and 14 show the actual measurements for the multiplier according to the second embodiment performed by the inventor, K, Kimura, to confirm the dc transfer characteristic and its change with respect to the bias voltage $V_c$. The transfer characteristic is shown in FIG.13 and is change is shown in FIG. 14.

FIG. 13 indicates the relationship between input signal voltage $V_x$ and the output voltage $VM_1$ generated by converting the current $I_M^+$ into voltage. The bias voltage $V_c$ is set at 75 mV.

FIG. 14 indicates the change of the dc transfer characteristic shown in FIG. 13. The input signal voltage $V_y$ is set at ±100 mV.

The above actual measurements were made at a supply voltage of 1 V and therefore, it was confirmed that this multiplier is capable of low-voltage operation at a voltage of 1 V. Also, the input voltage range with good linearity was approximately 200 $mV_{p-p}$, which is a very wide range.

In the second embodiment, the same advantages as those in the first embodiment can be obtained.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. An analog multiplier comprising:

(a) a first squarer applied differentially with a first input signal and a second input signal to be multiplied in opposite phases, said first squarer containing a first triple-tail cell;

said first triple-tail cell including first, second and third transistors whose emitter or sources are coupled together and driven by a single tail current;

said first and second transistors forming a differential transistor pair;

bases or gates of said first and second transistors forming input ends of said first squarer to be applied with said first and second input signals;

collectors or drains of said first and second transistors being coupled together to form one of output ends of said first squarer;

a collector or drain of said third transistor forming the other of said output ends of said first squarer;

a base or gate of said third transistor forming an input end to be applied with a bias signal;

(b) a second squarer applied differentially with said first input signal and said second input signal in the same phase, said second squarer containing a second triple-tail cell;

said second triple-tail cell including fourth, fifth and sixth transistors whose emitter or sources are coupled together and driven by a single tail current;

said fourth and fifth transistors forming a differential transistor pair;

bases or gates of said fourth and fifth transistors forming input ends of said second squarer to be applied with said first and second input signals;

collectors or drains of said fourth and fifth transistors being coupled together to form one of output ends of said second squarer;

a collector or drain of said sixth transistor forming the other of said output ends of said second squarer;

a base or gate of said sixth transistor forming an input end to be applied with said bias signal;

(c) said coupled collectors or drains, of said first and second transistors forming one of said output ends of said first squarer being connected to said collector or drain of said sixth transistor forming the other of said output ends of said second squarer, thereby forming one of output ends of said multiplier;

(d) said collector or drain of said third transistor forming the other of said output ends of said first squarer being connected to said coupled collectors or drains of said fourth and fifth transistors forming one of said output ends of said second squarer, thereby forming the other of said output ends of said multiplier; and (e) the multiplication result of said first and second input signals being taken out from said output ends of said multiplier.

2. An analog multiplier as claimed in claim 1, wherein said first and second transistors of said first triple-tail cell have the same driving capability, and said third transistor thereof has a driving capability κ times as large as that of said first and second transistors, where κ is equal to or greater than unity;

and wherein said fourth and fifth transistors of said second triple-tail cell have the same driving capability, and said sixth transistor thereof has a driving capability κ times as large as that of said fourth and fifth transistors.

3. An analog multiplier as claimed in claim 1, wherein said first, second, third, fourth, fifth and sixth transistors are MOSFETs;

and wherein said first and second MOSFETs have the same gate-width (W) to gate-length (L) ratio (W/L), and said third MOSFET has a gate-width (W) to gate-length (L) ratio (W/L) κ times as large as that of said first and second MOSFETs;

and wherein said fourth and fifth MOSFETs have the same gate-width (W) to gate-length (L) ratio (W/L), and said sixth MOSFET has a gate-width (W) to gate-length (L) ratio (W/L) κ times as large as that of said fourth and fifth MOSFETs.

4. An analog multiplier as claimed in claim 1, wherein said first, second, third, fourth, fifth and sixth transistors are bipolar transistors;

and wherein said first and second bipolar transistors have the same emitter area, and said third bipolar transistor has an emitter area κ times as large as that of said first and second bipolar transistors;

and wherein said fourth and fifth bipolar transistors have the same emitter area, and said sixth bipolar transistor has an emitter area κ times as large as that of said fourth and fifth bipolar transistors.

5. An analog multiplier as claimed in claim 1, wherein said bias signal is variable to adjust the transconductance characteristics of said multiplier.

* * * * *

UNITED STATES PATENT AND TRADEMARK OFFICE

CERTIFICATE OF CORRECTION

PATENT NO. : 5,617,052

DATED : April 1, 1997

INVENTOR(S) : Katsuji KIMURA

It is certified that error appears in the above-indentified patent and that said Letters Patent is hereby corrected as shown below:

Column 5, line 48, after "where" insert -- $\mu$ --.

Column 7, line 24, before "analog" insert --MOS--.

Column 8, line 30, delete "αF" and insert --$\alpha_F$--;
line 33, delete "$I_{C1} + I_{C3} = \alpha_F I_0$" and insert -- $I_{C1} + I_{C2} + I_{C3} = \alpha_F I_0$ --.

Signed and Sealed this

Second Day of September, 1997

Attest:

BRUCE LEHMAN

Attesting Officer

*Commissioner of Patents and Trademarks*